3,264,894
TRANSMISSION CONTROLS
George Popovich, Birmingham, and Edward S. Szczepanski, Mount Clemens, Mich., assignors to General Motors Corporation, Detroit, Mich., a corporation of Delaware
Filed Oct. 4, 1963, Ser. No. 314,013
12 Claims. (Cl. 74—477)

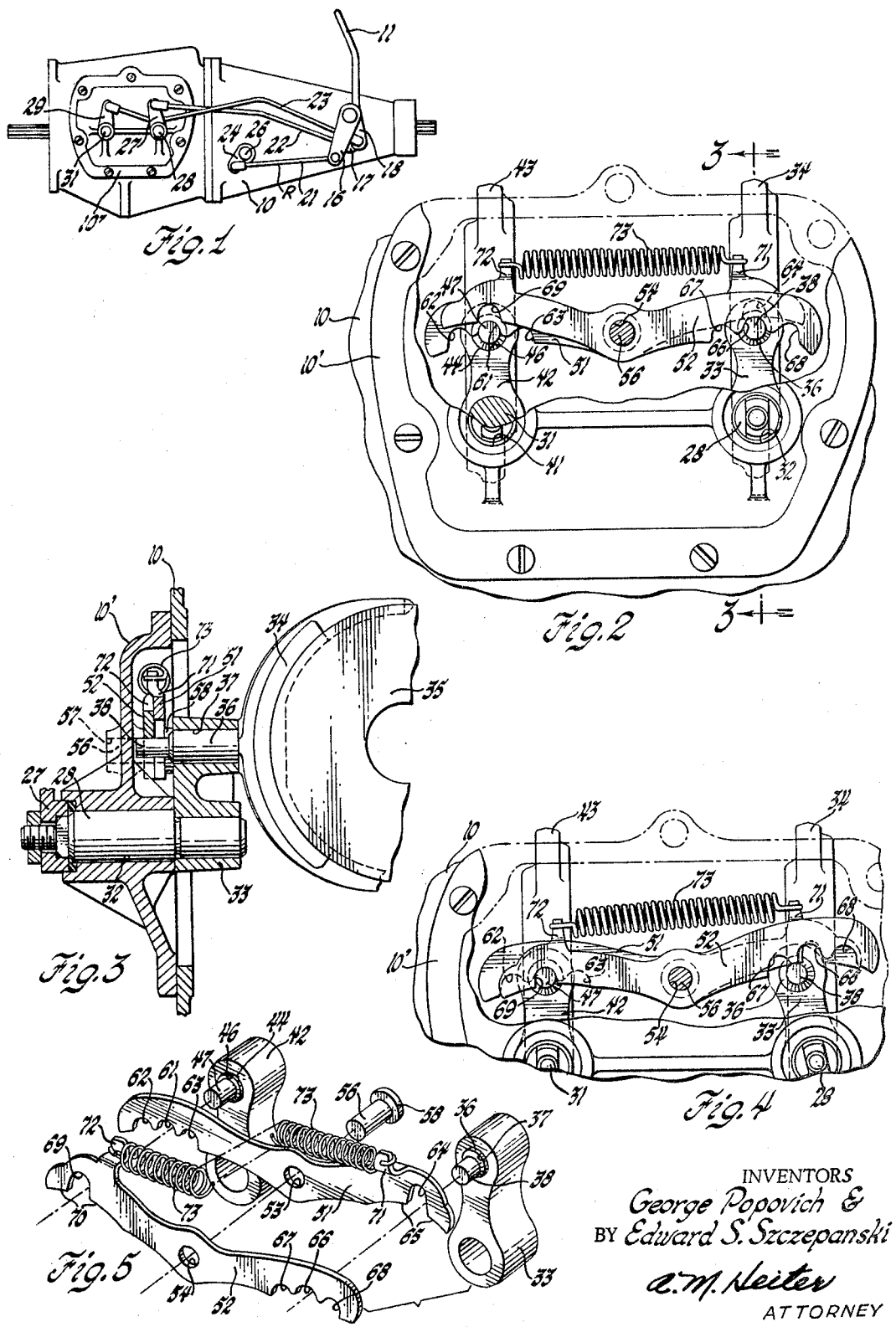

This invention relates to transmissions and particularly to a transmission control linkage.

The invention provides a transmission control linkage and interlock arrangement which may have the linkage connected through the transmission housing and cooperating with the gearing and the interlock mechanism entirely mounted on a transmission cover plate to facilitate assembly and disassembly for repair. An interlock linkage is provided in this assembly consisting of a pair of links cooperating with two laterally moving shifting elements to prevent movement of either element when the other is not in the neutral position. In the preferred form the interlock employs a pair of identical links having a central pivot and a single notch at one end and three notches at the other end. The links are placed in opposite relation to each other so that the single recess on one lever and the three recesses on the other lever cooperate with each laterally movable shifting element. A spring is interconnected between the levers to rotate the levers in opposite directions so that the end with the three recesses is biased to engage a laterally movable shifting element and the end with a single notch is biased away from the laterally movable shifting element. This arrangement provides a simple construction locking either shifting element in the neutral position until the other shifting element is moved to its neutral position.

An object of the invention is to provide in a transmission having a housing and a cover plate, a transmission control linkage mounted entirely on a cover plate having portions extending through the cover plate and cooperating with the gearing and an interlock mounted on the cover plate.

Another object of the invention is to provide in a transmission control linkage having a plurality of laterally moving elements a pair of pivoted levers arranged to engage the laterally moving elements to prevent movement of one element unless the other element is in the neutral position.

Another object of the invention is to provide in a transmission control system having a pair of laterally movable elements a pair of similar interlock levers arranged reversely with respect to each other biased to rotate in opposite directions and having cam surfaces arranged to prevent the shifting of one lever unless the other is in neutral position.

Another object of the invention is to provide in a transmission having a pair of laterally moving shifting elements each movable from a neutral position to one or more shift positions, a pair of duplicate interlock levers each having one interlock recess at one end and a plurality of cam recesses at the other end reversely located and centrally pivoted between the laterally moving shifting elements so an interlock recess on one lever and the cam recesses on the other lever engage each laterally moving shifting element and a spring device to urge each lever to rotate so the cam recesses engage each laterally moving shifting element.

These and other objects of the invention will be more apparent from the following description and drawing of a preferred embodiment of the invention.

FIGURE 1 is an elevation view of a transmission employing the invention.

FIGURE 2 is a partial enlargement of FIGURE 1 showing the cover plate portion with parts broken away to show the interior linkage.

FIGURE 3 is a section of FIGURE 2 on the lines 3—3.

FIGURE 4 is a partial view similar to FIGURE 2 but showing the interlock linkage in a ratio position.

FIGURE 5 is a partial exploded view of the interlock linkage.

The invention is illustrated in the preferred embodiment applied to a four speed and reverse transmission which may have gearing as shown in the Fodrea Patent 3,088,-336 and a housing 10 having a cover plate 10'. The transmission control lever 11, through a mechanism, as shown in the Primeau Patent 2,922,315 is connected to selectively operate the reverse lever 16, the first–second lever 17 and the third–fourth lever 18. These levers are connected by rods 21, 22 and 23, respectively, to the reverse shift fork lever 24 which is pivotally mounted on the reverse shaft 26 in the transmission housing, the first–second lever 27, which is mounted on the first–second shift shaft 28 and the third–fourth shift lever 29, which is mounted on the third–fourth shift shaft 31.

The first–second shift shaft 28 is pivotally mounted in the bearing aperture 32 in the cover member, and has the fork lever 33 fixed thereto at the inner end. The shift fork 34, which engages the shift collar 35 of the gearing in a conventional manner, as shown in Patent 3,088,336, has a trunnion portion 36 rotatably mounted in a bearing aperture 37 located in the fork lever 33 spaced from its pivot axis, the pivot axis of shift shaft 28. The trunnion 36 has a coaxially extending portion providing a locking pin 38.

The third–fourth shift shaft 31 is similarly pivotally mounted in a bearing aperture 41 in the transmission cover plate and has fixed thereto at its inner end a fork lever 42. The third–fourth fork 43 has a trunnion 44 extending therefrom pivotally mounted in a bearing aperture 46 spaced from the axis of the shaft 31. The trunnion 44 has a coaxial extension providing locking pin 47.

A pair of identical interlock levers 51 and 52 have central apertures 53 and 54 to pivotally mount the levers on a pivot pin 56 which is suitably secured in an aperture 57 in the transmission cover plate 10' and has a washer 58 secured to the end of the pin 56 to retain the levers in position thereon. The lever 51 has a plurality of shallow locking cam recesses at one edge, a neutral recess 61, a fourth speed recess 62 and a third speed recess 63, the speed recesses being disposed on opposite sides of the neutral recess. All of the recesses are positioned to engage third–fourth locking pin 47. At the other end of lever 51 there is a deeper interlocking cam recess 64 and cam surfaces 65 on opposite sides of recess 64. The cam recess and cam surfaces cooperate with the locking pin 38. The other lever 52 has three shallow recesses, a neutral recess 66, a second speed recess 67 and a first speed recess 68 similarly located for cooperating with locking pin 38 and at the other end a deep locking recess 69 and adjacent cam surfaces 70 for cooperating with locking pin 47. The lever 51 has a spring anchor tab 71 and the lever 52 has a spring anchor tab 72 between which the spring 73 is connected to bias lever 51 to rotate in a counterclockwise direction and lever 52 to rotate in a clockwise direction about the pin 56.

The locking levers function to prevent movement of either of the shift fork levers 33 and 42 from the neutral position, shown in FIGURE 2, to any shift position unless the other shift fork is in the neutral position. This will also prevent simultaneous movement of both shift forks from the neutral position. The spring 73 biases the levers so the end of each lever with the three recesses engages a locking pin. The other end of each lever with the single deep recess is withdrawn from its associated locking pin. On initial movement of fork lever 33 toward first ratio position, the pin 38 must pass under the lobe between recess 66 and 67, as shown in FIGURE 4, rotating lever 52 counterclockwise. This movement is permitted only if lever 42 and pin 47 are in the neutral position so lever 52 may rotate with pin 47 entering recess 69. If lever 42 is not in neutral, one of the cam surfaces 70 engages pin 47 and prevents any movement of lever 52 and thus movement of fork 33. When the first–second shift fork 33 is moved to either the first ratio position with the locking pin 38 under recess 68 or to the second position with the interlock pin under recess 67, as illustrated for example in FIGURE 4, the locking pin 38 will be located under cam surface 65 of lever 51 preventing rotation of lever 51 so that the notch 61 positively engages the locking pin 47 to hold or lock the third–fourth shift fork 42 in neutral position. Similarly, when the third–fourth shift fork 42 is moved so that the interlock pin 47 is in either the third ratio recess 63 or the second ratio recess 62, the interlock pin 47 will be beneath the cam surfaces 70 on opposite sides of recess 69 to rotate the shift interlock lever 52 clockwise so that the notch 66 engages interlock 38 to prevent movement of first–second shift fork lever 33.

Thus these two identical levers, which may be stamped with the same dies and are biased by a single spring about their pivot on the transmission cover provide a simple and effective transmission interlock.

The above-described preferred embodiment of the invention may be modified within the scope of the appended claims.

We claim:
1. In a linkage mounted on a support;
(a) a pair of shiftable elements each movable along a path relative to the support each to a plurality of shift positions;
(b) interlock means employing a pair of interlock levers pivoted to the support and each lever having a portion movable relative to each element and having cam surfaces on each lever directly engaging each of said elements and means to bias both interlock levers into engagement with said elements to resiliently hold either element in the first position when the other element is in the first position and to positively lock either element in the first position when the other element is in a position other than the first.

2. The invention defined in claim 1 and said interlock levers being identical flat plate levers with the cam surfaces on the edge and the recesses extending inwardly from the edge mounted on the same pivot axis.

3. In a control linkage;
(a) a support;
(b) a pair of shift control members each being mounted on said support for movement from a neutral position to a ratio position and having a locking member;
(c) a pair of duplicate levers each having at one end a neutral and a ratio cam recess and having at the other end a cam surface and a recess;
(d) said levers being pivotally mounted on said support with one end of one lever and the other end of the other lever cooperating with each locking member for blocking movement of each locking member when the other is not in the neutral position;
(e) means to bias both of said levers to move said neutral and ratio recess into engagement with said cooperating locking member to resiliently hold said cooperating locking member in the neutral or ratio position when the other locking member is in the neutral position.

4. In a control linkage;
(a) a support;
(b) a pair of shift control members each being mounted on said support for movement from a neutral position to a ratio position and having a locking member;
(c) a pair of similar levers each having at one end a cam surface between a neutral and a ratio recess and having at the other end a cam surface and an interlock recess;
(d) said levers being pivotally mounted on said support with one end of one lever and the other end of the other lever cooperating with each locking member;
(e) means to bias both of said levers to a normal position with said one end of each lever in engagement with the cooperating locking member;
(f) said levers in said normal position having said one end of each lever located with said cooperating locking member in said neutral recess and said other end having said cam surface clearing the other locking member to permit free movement, said cam surface at said one end of each lever resiliently holding the cooperating locking member in neutral position and operative on initial movement of the cooperating locking member to rotate the lever to cause said cam surface at the other end to engage said other locking member when in ratio position preventing movement of the cooperating locking member and to cause said recess at the other end to envelop said other locking member when in neutral position permitting movement of the cooperating locking member.

5. The invention defined in claim 4 and said pair of levers being identical plate levers with the cam surfaces and recesses on an edge.

6. In a control linkage;
(a) a support;
(b) a pair of shift levers pivotally mounted on said support at spaced parallel axes;
(c) each shift lever being rotatable from a neutral position to a shift position and having a locking member thereon rotatable with the lever;
(d) a pair of identical stamped plate interlock levers each having a central pivot aperture, and on one side of said pivot aperture an edge cam surface, a locking recess extending therefrom into the lever and a spring anchor, and at the other side of said pivot aperture a neutral recess and a shift position recess extending inwardly from the edge of the lever;
(e) said levers being pivotally mounted on said support between said spaced parallel axes and located in opposite relationship with a locking recess on one lever and the neutral and shift position recesses on the other lever being engageable with each locking member;
(f) a tension spring attached to said spring anchors biasing both levers to urge the neutral and shift position recesses into engagement with the cooperating locking member to resiliently hold the cooperating locking member in each position;
(g) each locking member on movement from the neutral position to the shift position engaging one interlock lever between the neutral and shift position recesses and rotating the one interlock lever to move the locking recess at the other end into engagement with the other locking member to hold said other locking member in neutral position and said edge cam surface preventing rotation of the one interlock lever and locking member when the other locking member is not in the neutral position.

7. In a transmission;
(a) a transmission housing having a cover plate;
(b) gearing mounted within said housing having shiftable elements;
(c) a pair of shift control members each engaging a shiftable element and mounted on said cover plate for movement from a neutral position to a ratio posion and having a locking member similarly movable;
(d) a pair of duplicate levers each having at one end a neutral and a ratio detent recess defining an intermediate moving cam and having at the other end a blocking cam surface and a locking recess;

(e) said levers being centrally pivotally mounted on said cover plate on the same axis between said locking members with one end of one lever and the other end of the other lever cooperating with each locking member;

(f) means to bias both of said levers to move said neutral and ratio recess into engagement with said cooperating locking member to releasably detent hold each shift control member in its neutral or a ratio position when the other shift control member is in neutral position and to positively hold each shift control member in neutral position when the other shift control member is in a ratio position.

8. In a transmission;

(a) a transmission housing having transmission gearing located therein with two shift collars to control the transmission gearing;

(b) a transmission cover plate on said housing;

(c) a pair of shift shafts rotatably mounted in said cover plate and having fixed thereto a shift fork lever;

(d) a shift fork having an interlock pin pivotally mounted eccentrically on a parallel axis on each of said shift fork levers;

(e) a first interlock lever pivotally mounted on said cover plate between said interlock pins having a deep recess and adjacent cam surfaces for engaging one interlock pin and a plurality of shallow recesses for engaging the other interlock pin;

(f) a second interlock lever having a single deep recess and side cam surfaces engaging said another interlock pin and a plurality of shallow recesses engaging said one interlock pin and being pivotally mounted on said cover plate;

(g) biasing means biasing said interlock levers for rotation in opposite directions to bias said interlock levers so said shallow recesses engage said interlock pins to resiliently hold said interlock pins in each position when the other is in one position and to lock said interlock pins when the other is in another position.

9. In a control linkage, a support, a first and a second shiftable element mounted on said support for movement to a plurality of shift positions, a first and a second lever, first and second locking means operatively connecting respectively the first lever to the first element and the second lever to the second element, first and second interlock means operatively connecting respectively the first lever to the second element and the second lever to the first element, each of said locking means having a disengaged position permitting movement of the connected element relative to the connected lever and being movable in each of said plurality of shift positions of the connected element to an engaged position to hold the connected element and lever in each of said plurality of shift positions, each of said interlock means having a disengaged position permitting free movement and movable in only one of said plurality of shift positions of the connected element to an engaged position to hold the connected element and lever in said one shift position, pivot means to pivot each of said levers on said support for pivotal movement in one direction to engage the locking means and disengage the interlock means and in the other direction to disengage the locking means and engage the interlock means to permit movement of either element only when the other is in said one shift position, biasing means to bias each lever in said one direction to normally engage said locking means, and each of said locking means being disengaged against said biasing means by movement of the connected element between any shift positions and resiliently holding the connected element in any shift position when the other element is in said one position and blocking movement of the connected element when the other element is in any other position.

10. The invention defined in claim 9 and said levers being identical plate levers with said locking means and interlock means formed in part in the edge of said levers and said levers being centrally pivoted in the same pivot axis.

11. The invention defined in claim 10 and said shiftable elements being pins mounted on shift forks and being parallel to said pivot axis.

12. The invention defined in claim 11 and said biasing means being a coil spring in tension and connected at each end to a lever on the interlock side of the pivot.

References Cited by the Examiner
UNITED STATES PATENTS

| | | | |
|---|---|---|---|
| 2,438,691 | 3/1948 | Armantrout | 74—477 |
| 2,527,965 | 10/1950 | Russey | 74—477 |
| 2,716,354 | 8/1955 | Dick | 74—477 |
| 2,911,856 | 11/1959 | Simpson et al. | 74—477 X |

MILTON KAUFMAN, *Primary Examiner.*